(12) United States Patent
Choi et al.

(10) Patent No.: US 11,872,889 B2
(45) Date of Patent: Jan. 16, 2024

(54) INDEPENDENT DRIVE MODULE

(71) Applicant: HYUNDAI MOBIS CO., LTD., Seoul (KR)

(72) Inventors: Won Hyok Choi, Seoul (KR); Kyongwon Min, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 170 days.

(21) Appl. No.: 17/529,610

(22) Filed: Nov. 18, 2021

(65) Prior Publication Data

US 2022/0203823 A1 Jun. 30, 2022

(30) Foreign Application Priority Data

Dec. 28, 2020 (KR) .................. 10-2020-0184815
Dec. 29, 2020 (KR) .................. 10-2020-0186300

(51) Int. Cl.
| | |
|---|---|
| *B60K 7/00* | (2006.01) |
| *B60G 3/20* | (2006.01) |
| *B60G 15/06* | (2006.01) |
| *B62D 7/14* | (2006.01) |

(52) U.S. Cl.
CPC .............. *B60K 7/0007* (2013.01); *B60G 3/20* (2013.01); *B60G 15/067* (2013.01); *B62D 7/146* (2013.01); *B60K 2007/0092* (2013.01)

(58) Field of Classification Search
CPC .................. B62D 7/146; B60K 7/0007; B60K 2007/0092; B60G 3/20
See application file for complete search history.

(56) References Cited

U.S. PATENT DOCUMENTS

| | | | |
|---|---|---|---|
| 7,059,437 B2* | 6/2006 | Heinen ................. | B60G 15/07 |
| | | | 310/67 R |
| 11,633,995 B2* | 4/2023 | Mohrlock ............ | B60G 7/008 |
| | | | 280/124.134 |
| 2003/0146029 A1 | 8/2003 | Heinen | |

(Continued)

FOREIGN PATENT DOCUMENTS

| | | |
|---|---|---|
| CN | 105882741 A | 8/2016 |
| DE | 10120742 A1 | 10/2002 |

(Continued)

OTHER PUBLICATIONS

Extended European Search Report dated May 9, 2022 in counterpart European Patent Application No. 21208310.9 (8 pages in English).

*Primary Examiner* — Brian L Swenson
(74) *Attorney, Agent, or Firm* — NSIP Law

(57) ABSTRACT

An independent drive module includes: an in-wheel motor configured to provide driving force to a wheel of a vehicle; a support arm including a first end connected to a vehicle body and a second end connected to the in-wheel motor, to support the in-wheel motor; a shock absorber module including a first end connected to the in-wheel motor and a second end connected to the vehicle body, the shock absorber being configured to absorb shock between the in-wheel motor and the vehicle body and swivel the in-wheel motor during turning of the vehicle so as to perform both shock absorption and steering; and a steering motor connected to the second end of the shock absorber module to transmit rotational force for the steering to the shock absorber module.

12 Claims, 9 Drawing Sheets

(56) References Cited

U.S. PATENT DOCUMENTS

| | | | |
|---|---|---|---|
| 2006/0131799 A1* | 6/2006 | Carlitz | B60G 17/021 |
| | | | 267/195 |
| 2008/0190677 A1* | 8/2008 | Muller | B60L 15/20 |
| | | | 180/65.51 |
| 2019/0111865 A1* | 4/2019 | Tamura | B60G 13/00 |
| 2021/0023899 A1* | 1/2021 | Wuebbolt-Gorbatenko | ........ |
| | | | B60G 15/06 |
| 2023/0115506 A1* | 4/2023 | Chang | B62D 7/18 |
| | | | 180/408 |

FOREIGN PATENT DOCUMENTS

| | | |
|---|---|---|
| KR | 10-2019-0041855 A | 4/2019 |
| KR | 10-2016955 B1 | 9/2019 |

\* cited by examiner

INDEPENDENT DRIVE MODULE

CROSS REFERENCE TO RELATED APPLICATIONS

This application claims the benefit under 35 U.S.C. § 119(a) of Korean Patent Application No. 10-2020-0184815 and Korean Patent Application No. 10-2020-0186300, filed on Dec. 28, 2020 and Dec. 29, 2020, respectively, in the Korean Intellectual Property Office, the entire disclosures of which are incorporated herein by reference for all purposes.

BACKGROUND

Field of the Invention

The present invention generally relates to an independent drive module and, more particularly, to a technology of independent drive modules mounted on wheels of a vehicle, respectively, to individually operate the driving and steering of the wheels.

Description of the Related Art

An electric vehicle (EV) refers an eco-friendly vehicle without exhaust gas emission. The electric vehicle is essentially provided with a high-voltage battery supplying energy for propulsion, an inverter converting direct current (DC) power output from the high-voltage battery into alternating current (AC) power, a drive motor generating rotational force by receiving the AC power from the inverter to propel the vehicle, and the like. The rotational force of the motor is decelerated by a reducer and then transmitted to wheels through a drive shaft, thereby propelling the electric vehicle.

Recently, an in-wheel motor vehicle in which a motor is directly disposed inside a rim of each wheel on which a tire is to be mounted such that the motor may directly transmit power to the wheel has come to prominence, since intermediate components of a powertrain, such as a reducer or a differential gear, may be omitted to reduce the weight of the vehicle and reduce energy loss in a power transmission process.

In addition, the in-wheel motor may include an independent steering device and an independent drive module that are mounted on each of wheels of the vehicle.

In the independent drive module of the related art, a suspension device is added to the steering device thus increasing the weight and cost, which are problematic.

The foregoing is intended merely to aid in the understanding of the background of the present invention, and is not intended to mean that the present invention falls within the purview of the related art that is already known to those skilled in the art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an independent drive module includes: an in-wheel motor configured to provide driving force to a wheel of a vehicle; a support arm including a first end connected to a vehicle body and a second end connected to the in-wheel motor, to support the in-wheel motor; a shock absorber module including a first end connected to the in-wheel motor and a second end connected to the vehicle body, the shock absorber being configured to absorb shock between the in-wheel motor and the vehicle body and swivel the in-wheel motor during turning of the vehicle so as to perform both shock absorption and steering; and a steering motor connected to the second end of the shock absorber module to transmit rotational force for the steering to the shock absorber module.

The shock absorber module may include: a cylinder extending in a longitudinal direction and containing fluid; and a rod inserted into the cylinder and configured to slide in the longitudinal direction.

The rod may include a protrusion protruding outward from an outer surface, and the cylinder may include a slot indented in a position corresponding to the protrusion.

The shock absorber module may further include a fixing portion disposed on an outer portion of the cylinder and extending in the longitudinal direction. The cylinder may include a slot indented in a position corresponding to the fixing portion such that the fixing portion is inserted into the slot.

The shock absorber module may include a connecting portion connected and coupled to the steering motor to be rotatable in a direction intersecting a longitudinal direction of the shock absorber module, such that the connecting portion transmits rotary force of the steering motor to the in-wheel motor, thereby swiveling the in-wheel motor.

The support arm may include an upper arm and a lower arm spaced apart from each other in a top-bottom direction and connecting the vehicle body and the in-wheel motor to each other. The upper arm may include a through-hole. The shock absorber module may be connected to a bottom portion of the in-wheel motor while extending through the through-hole.

The shock absorber module may include a connecting portion extending through the upper arm and coupled to the in-wheel motor to be rotatable in a direction intersecting a longitudinal direction of the shock absorber module.

The shock absorber module may be connected to the in-wheel motor such that a central shaft of the shock absorber module is inclined with respect to a top-bottom radial axis of the in-wheel motor.

The first end of the support arm may be coupled to the vehicle body to be rotatable in a top-bottom direction, and the second end of the support arm may be coupled to the in-wheel motor to be rotatable in any direction.

The in-wheel motor may be configured to be swiveled and steered about a virtual steering axis extending through the second end of the support arm and a connecting portion connecting the shock absorber module and the steering motor.

The shock absorber module may include a connecting portion including an end connected to the in-wheel motor through a rigid joint.

The shock absorber module may include an elastic member surrounding outer portions of the shock absorber module. The elastic member may be compressed or stretched as a length of the shock absorber module is changed, thereby absorbing shock applied to the vehicle body.

The shock absorber module may be configured to be displaced in a longitudinal direction of the shock absorber module, while rotation of the shock absorber module about the longitudinal direction is prevented.

Other features and aspects will be apparent from the following detailed description, the drawings, and the claims.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION

Figure 1:
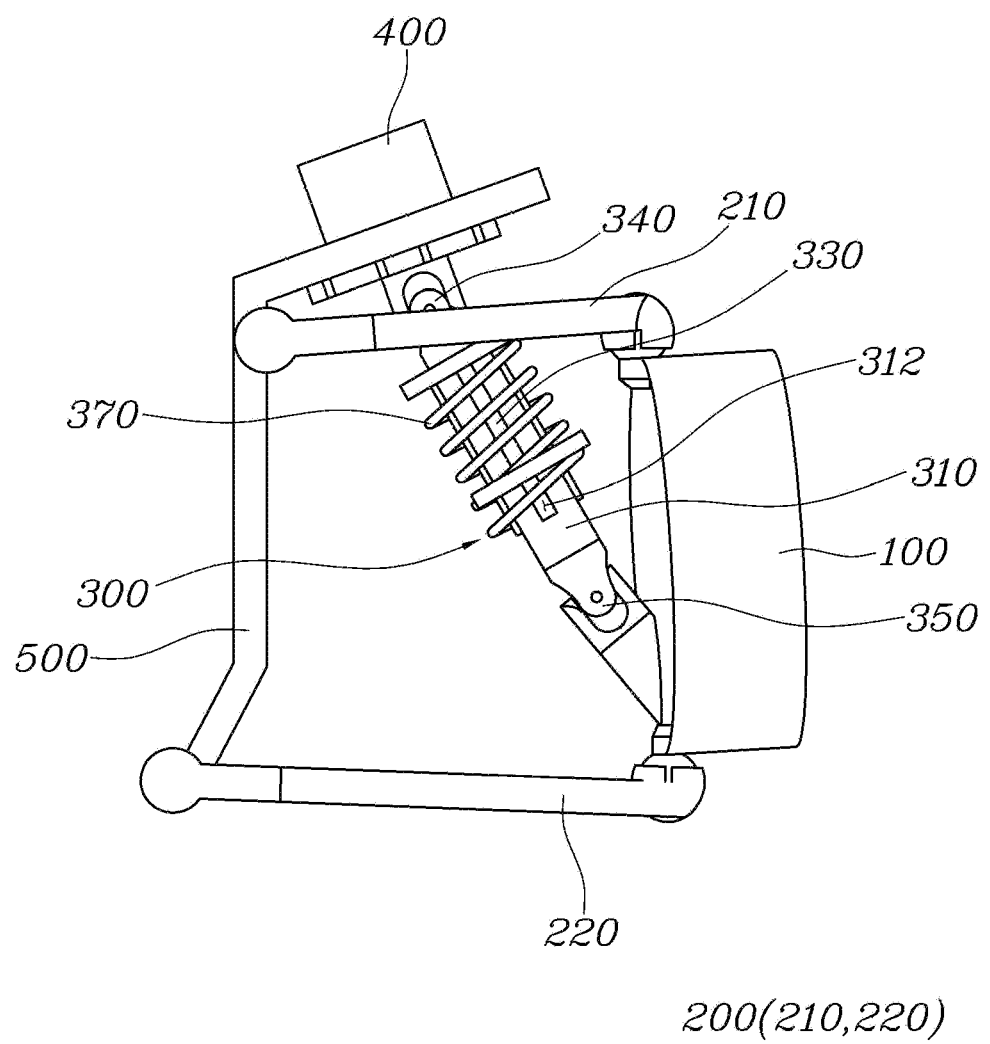
FIG. 1 illustrates an independent drive module according to an embodiment of the present invention.

Specific structural and functional descriptions of embodiments of the present invention disclosed herein are only for illustrative purposes of the embodiments of the present invention. The present invention may be embodied in many different forms without departing from the spirit and significant characteristics of the present invention. Therefore, the embodiments of the present invention are disclosed only for illustrative purposes and should not be construed as limiting the present invention.

Reference will now be made in detail to various embodiments of the present invention, specific examples of which are illustrated in the accompanying drawings and described below, since the embodiments of the present invention may be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it may be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements such as "between", "directly between", "adjacent to", or "directly adjacent to" should be construed in the same way.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

Hereinafter, exemplary embodiments of the present invention will be described in detail with reference to the accompanying drawings. Throughout the drawings, the same reference numerals will refer to the same or like parts.

Figure 2:
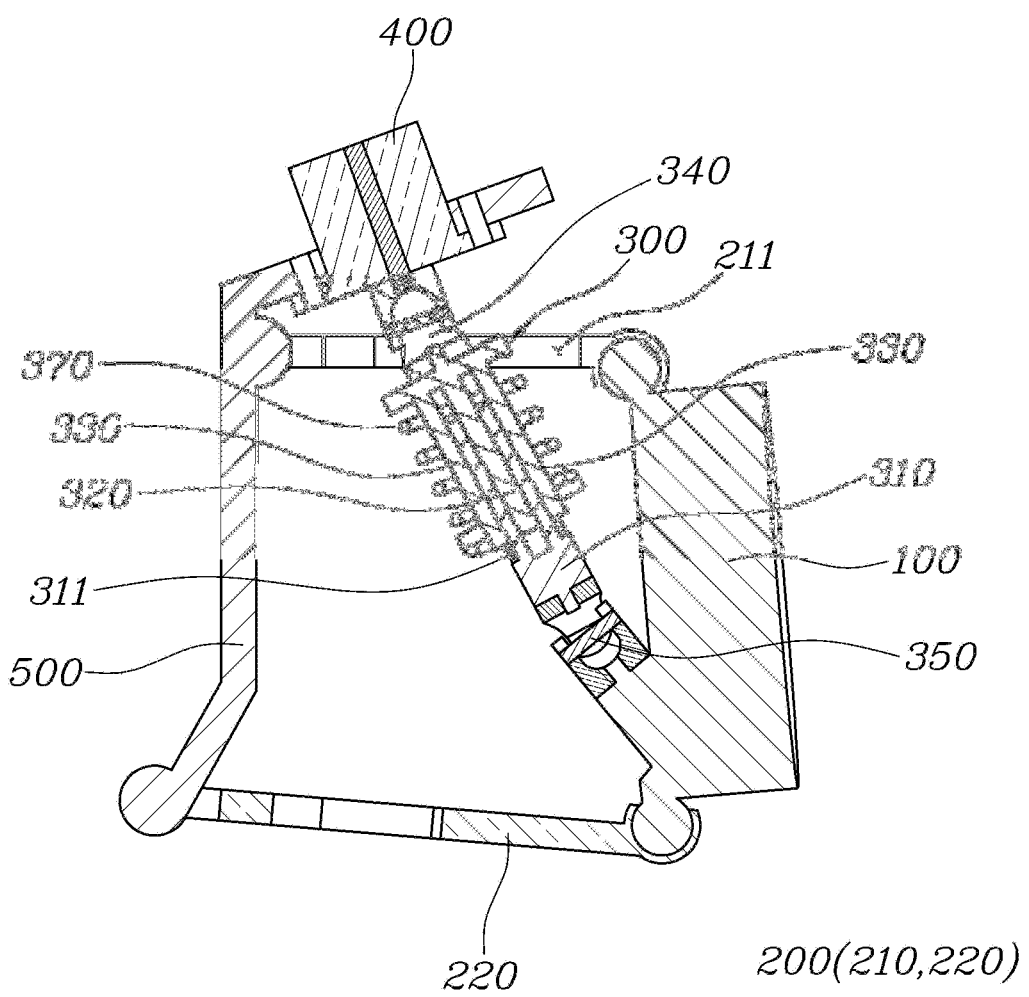
FIG. 2 is an A-A cross-sectional view of FIG. 1.
Figure 3:
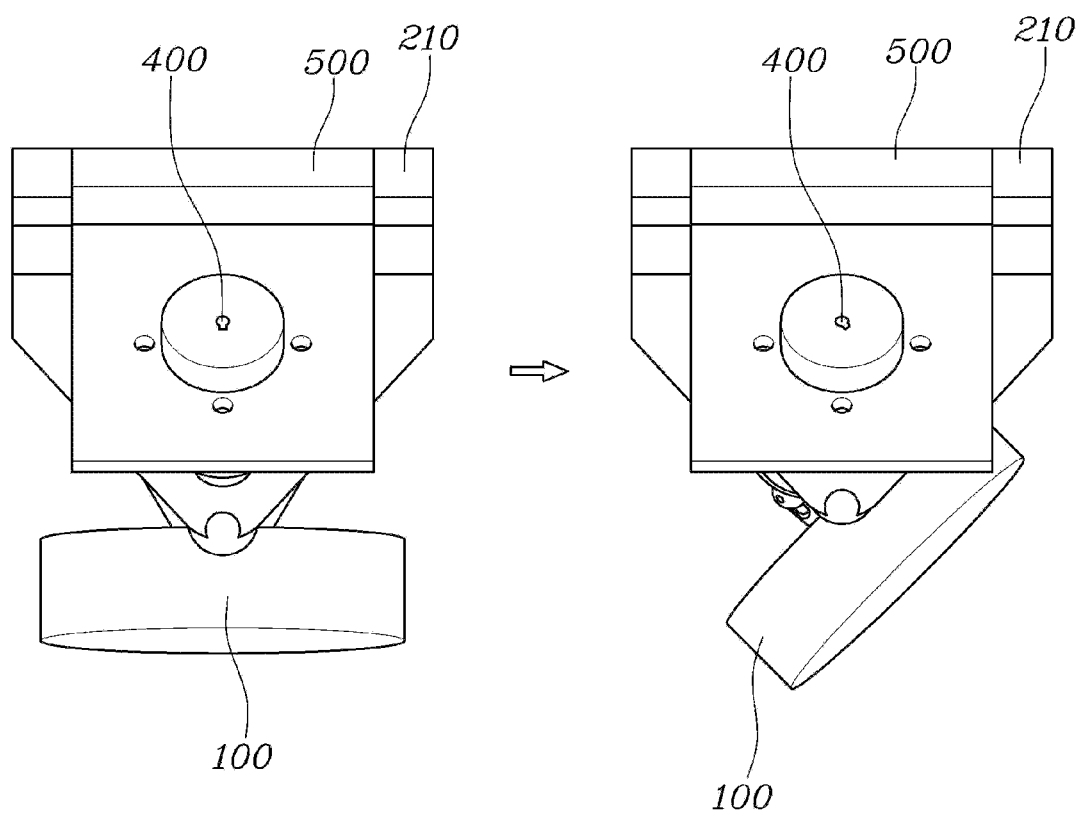
FIG. 3 illustrates the operation of the steering motor of the independent drive module according to an embodiment of the present invention.
Figure 4:
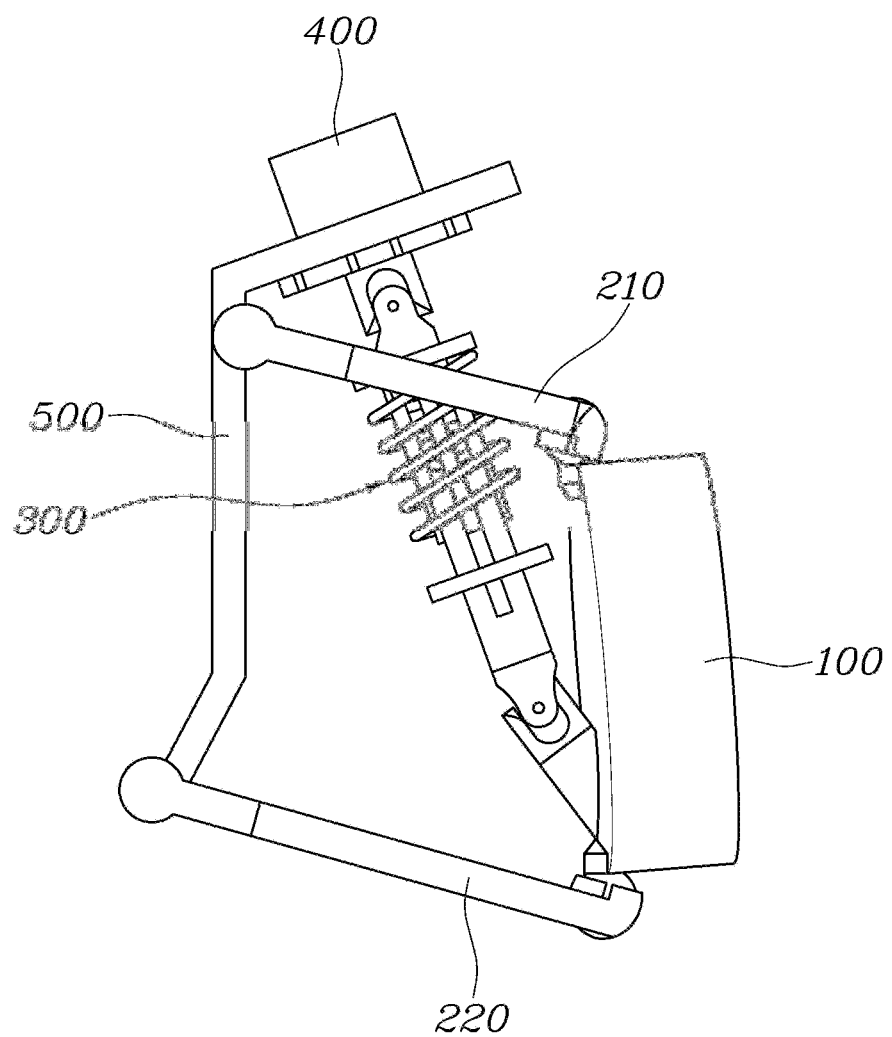
FIG. 4 illustrates a change in camber depending on the length of the shock absorber module of the independent drive module according to an embodiment of the present invention.
Figure 5:
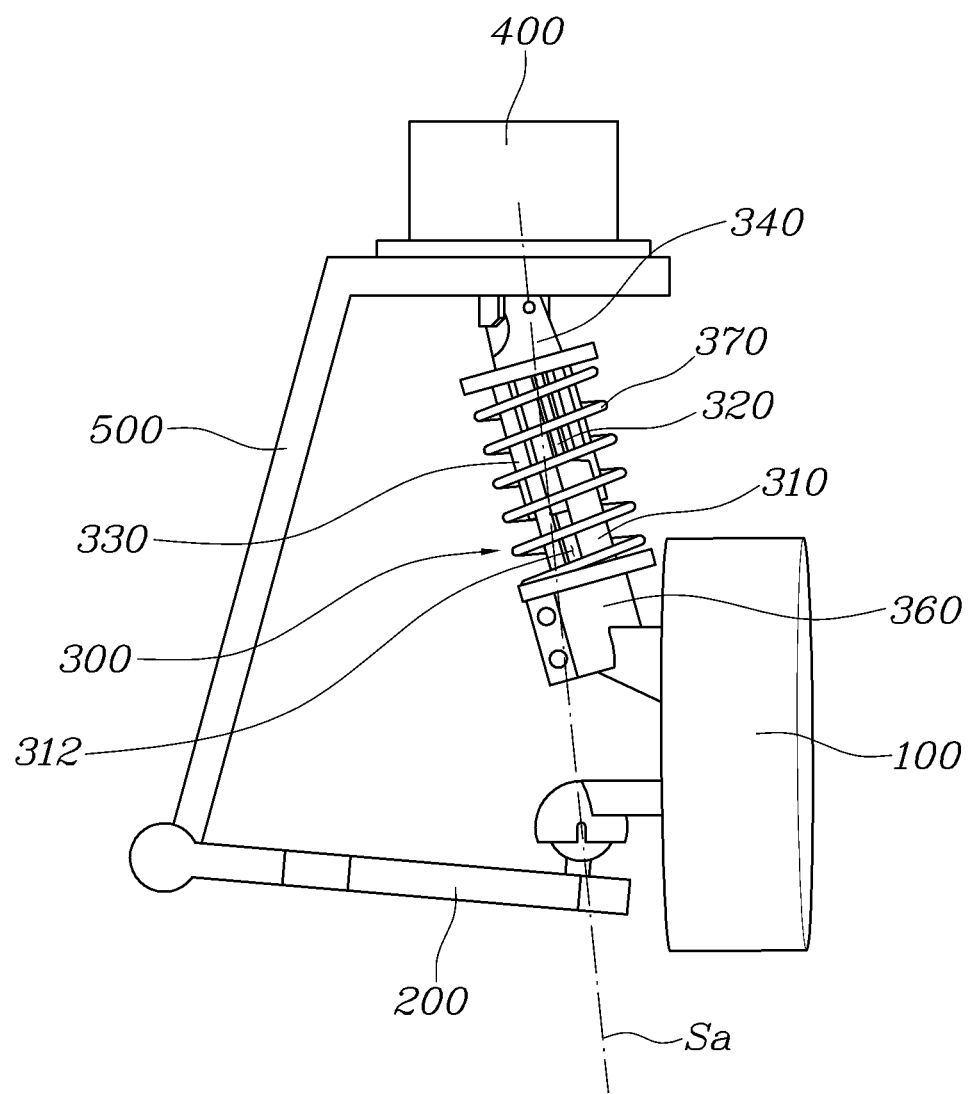
FIG. 5 illustrates a second embodiment of the present invention.

FIG. 1 illustrates an independent drive module according to an embodiment of the present invention, FIG. 2 is an A-A cross-sectional view of FIG. 1, FIG. 3 illustrates the operation of a steering motor 400 of the independent drive module according to an embodiment of the present invention, FIG. 4 illustrates a change in camber depending on the length of a shock absorber module 300 of the independent drive module according to an embodiment of the present invention, and FIG. 5 illustrates a second embodiment of the present invention.

An exemplary embodiment of the independent drive module according to the present invention will be described with reference to FIGS. 1 to 5.

The independent drive module according to the present invention is a module connecting each wheel of a vehicle to the vehicle and configured to control the driving and steering of the wheel.

The independent drive module according to the present invention includes: an in-wheel motor 100 providing driving force to a wheel of a vehicle; a support arm 200 having a first end connected to a vehicle body 500 and a second end connected to the in-wheel motor 100 to support the in-wheel motor 100; the shock absorber module 300 having a first end connected to the in-wheel motor 100 and a second end connected to the vehicle body 500 and configured to absorb shock between the in-wheel motor 100 and the vehicle body 500 and swivel the in-wheel motor 100 during turning of the vehicle so as to realize both shock absorption and steering; and the steering motor 400 connected to the second end of the shock absorber module 300 to transmit rotational force for the steering to the shock absorber module 300.

The in-wheel motor 100 may be disposed inside a wheel to control the rotation of the wheel to propel the vehicle, be connected to a high-voltage battery provided in the vehicle, and operate using power supplied by the battery.

The support arm 200 may extend in the direction from the vehicle body 500 to the in-wheel motor 100 to connect the in-wheel motor 100 to the vehicle body 500. In this regard, the first end of the support arm 200 is connected to the vehicle body 500, and the second end of the support arm 200 is connected to the in-wheel motor 100.

The first end of the shock absorber module 300 is connected to the rotor shaft of steering motor 400, and the second end of the shock absorber module 300 is connected to the in-wheel motor 100 coupled to the wheel. The shock absorber module 300 may rotate in response to the driving of the steering motor 400 to transmit rotating force to the in-wheel motor 100, thereby swiveling the in-wheel motor 100 about the support arm 200.

In addition, the shock absorber module 300 may be length variable to be contracted or stretched in length. In this manner, the shock absorber module 300 may absorb shock or vibrations transmitted to the vehicle body through the in-wheel motor 100, thereby improving the quietness of the vehicle.

Accordingly, it is possible to remove a shock absorber separately mounted on the independent drive module of the related art and integrally fabricate the steering module and the shock absorber, thereby reducing costs. In addition, the range of use of the cabin space of the vehicle may be further increased.

In addition, since the shock absorber and the steering module are integrated with each other, it is possible to reduce the weight of the vehicle.

The shock absorber module 300 may include a cylinder 310 extending in the longitudinal direction and containing fluid therein and a rod 320 inserted into the cylinder 310 and configured to be slide in the longitudinal direction.

Due to the cylinder 310 having a hollow structure extending in the longitudinal direction, with a first end thereof being closed and the inner space being filled with fluid, and the rod 320 configured to be inserted into the cylinder 310, the shock absorber module 300 may be stretched or contracted in the longitudinal direction as the fluid is compressed or expanded.

In this manner, the shock absorber module 300 may absorb shock or vibrations transmitted through the wheel and the in-wheel motor 100 from the road.

In addition, as illustrated in FIG. 3, the shock absorber module 300 is adjustable in length, and thus, toe-camber setting in the vehicle is possible.

Figure 6:
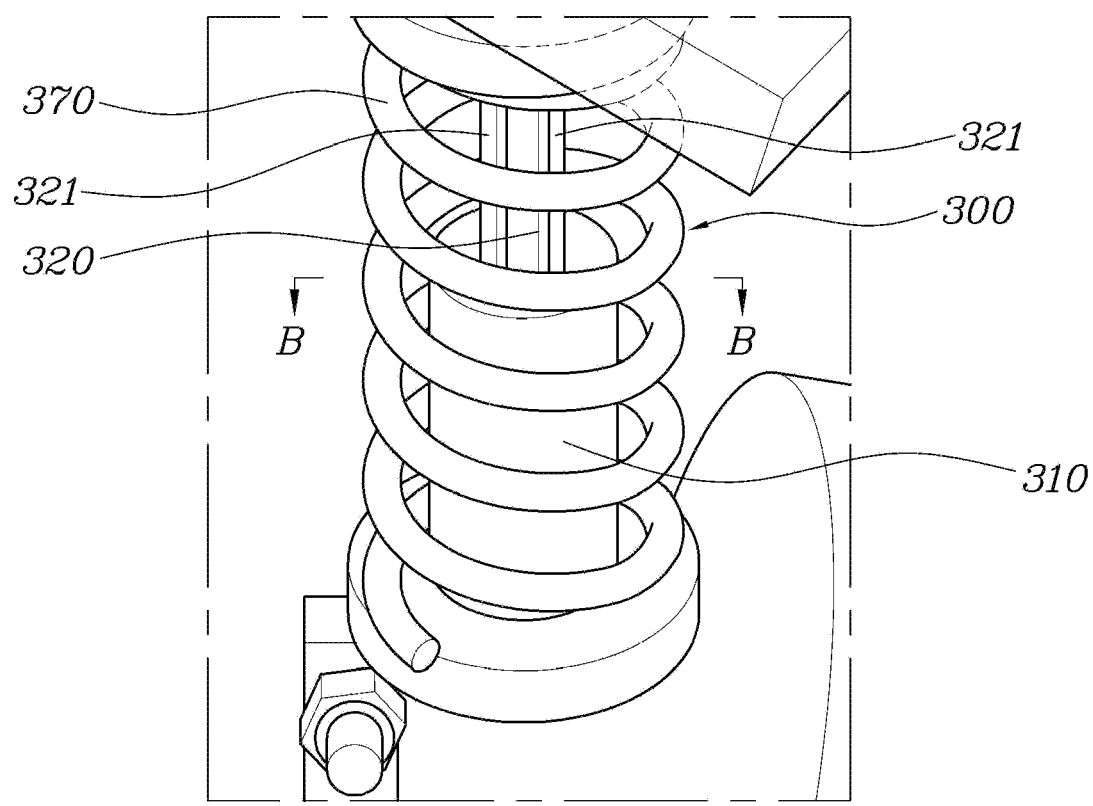
FIG. 6 illustrates a first embodiment of the shock absorber module of the independent drive module according to an embodiment of the present invention.
Figure 7:
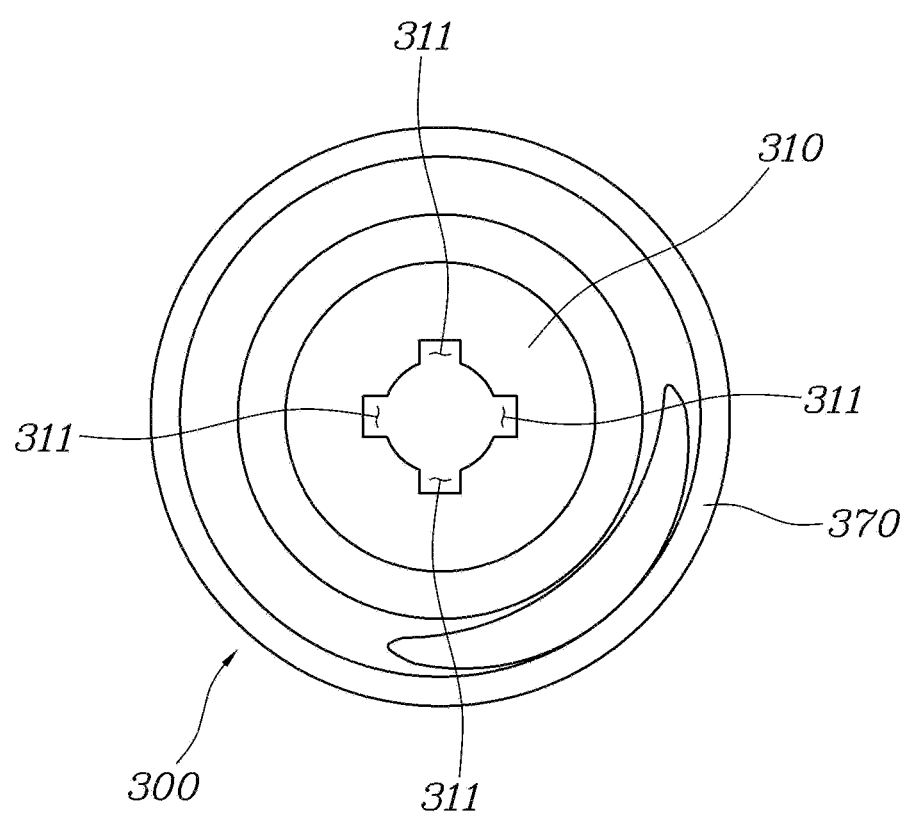
FIG. 7 is a B-B cross-sectional view of FIG. 6.

FIG. 6 illustrates a first embodiment of the shock absorber module 300 of the independent drive module according to an embodiment of the present invention, and FIG. 7 is a B-B cross-sectional view of FIG. 6.

Also referring to FIGS. 6 and 7, the rod 320 may have protrusions 321 protruding from the outer surface, and the cylinder 310 may have first slots 311 indented to correspond to the protrusion 321.

When the rotor shaft of the steering motor 400 rotates, the shock absorber module 300 may be rotated to swivel the in-wheel motor 100, thereby steering the wheel.

Here, the rod 320 or the cylinder 310 may be rotated about the rotor shaft of the steering motor 400 so that rotary force is not transmitted to the in-wheel motor 100. In order to prevent this problem, a plurality of protrusions 321 is provided on the outer surface of the rod 320 such that the protrusions 321 are spaced apart from each other by predetermined distances. The first slots 311 are indented in the cylinder 310 at positions corresponding to the protrusions 321, such that the protrusions 321 may be inserted into the first slots 311 so as to be movable in the longitudinal direction.

The first slots 311 may be provided in an inlet portion through which the rod 320 is inserted into the cylinder 310 or may be provided in the inner side surface of the cylinder 310, such that the protrusions 321 may be inserted into the first slots 311.

According to this configuration, when the steering motor 400 is running, the protrusions 321 may be inserted into the first slots 311 and prevent at least one of the cylinder 310 and the rod 320 from rotating with respect to the other in the direction in which the steering motor 400 rotates.

Figure 8:
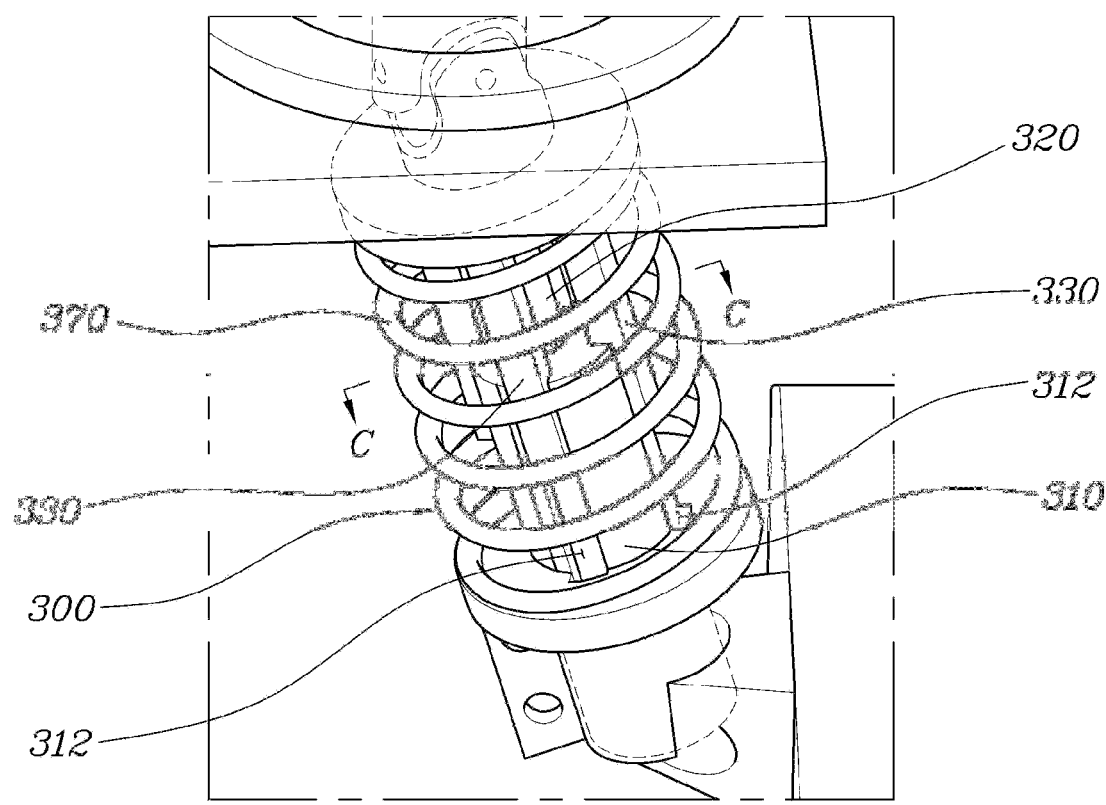
FIG. 8 illustrates a second embodiment of the shock absorber module of the independent drive module according to an embodiment of the present invention.
Figure 9:
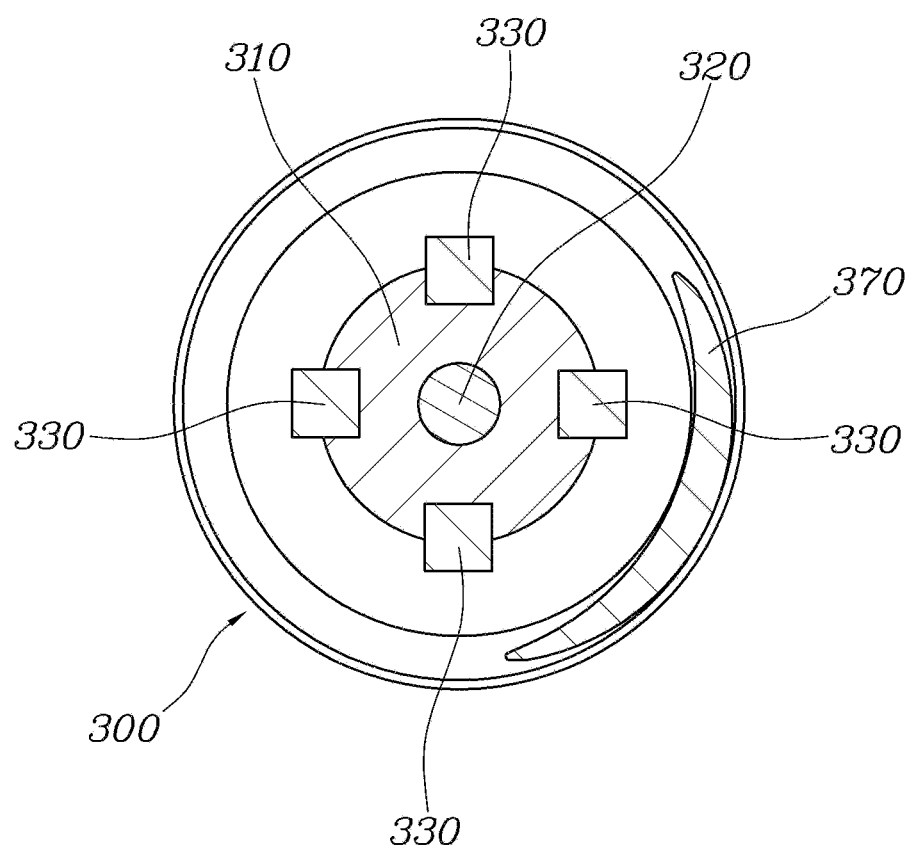
FIG. 9 is a C-C cross-sectional view of FIG. 8.

FIG. 8 illustrates a second embodiment of the shock absorber module of the independent drive module 300 according to an embodiment of the present invention; and FIG. 9 is a C-C cross-sectional view of FIG. 8.

Also referring to FIGS. 8 and 9, the shock absorber module 300 may further include fixing portions 330 provided on outer portions of the cylinder 310 and extending in the longitudinal direction. The cylinder 310 may have second slots 312 indented in positions corresponding to the fixing portions 330 such that the second slots 312 may be inserted into the second slots 312.

When the rotor shaft of the steering motor 400 rotates, the shock absorber module 300 may be rotated to swivel the in-wheel motor 100, thereby steering the wheel.

In order to prevent this, the plurality of fixing portions 330 may be provided on the outer portions of the cylinder to extend in the longitudinal direction of the rod, the fixing portions 330 being spaced apart from each other by predetermined distances, and the cylinder 310 may have the second slots 312 indented such that the fixing portions 330 may be inserted into the slots 312 to be movable in the longitudinal direction.

According to this configuration, when the steering motor 400 is running, the fixing portions 330 may be inserted into the second slots 312 in order to prevent at least one of the cylinder 310 and the rod 320 from rotating with respect to the other in the direction in which the steering motor 400 rotates.

The shock absorber module 300 may include a first connecting portion 340 connected and coupled to the steering motor 400 to be rotatable in a direction intersecting the longitudinal direction of the shock absorber module 300. The first connecting portion 340 may transmit the rotary force of the steering motor 400 to the in-wheel motor 100, thereby swiveling the in-wheel motor 100.

As illustrated in FIGS. 1 and 2, the first end of the shock absorber module 300 may be connected to the steering motor 400. The steering motor 400 and the shock absorber module 300 may be connected through the first connecting portion 340 rotatable in the direction intersecting the longitudinal direction of the shock absorber module 300 in order to transmit the rotary force of the steering motor 400 to the in-wheel motor 100.

The first connecting portion 340 may be a universal joint.

Accordingly, the shock absorber module 300 may be rotated by rotating the steering motor 400 coupled to the vehicle body 500, and the wheel may be steered by swiveling the in-wheel motor 100 in the front-back direction of the vehicle.

The support arm 200 may include an upper arm 210 and a lower arm 220 spaced apart from each other in the top-bottom direction and connecting the vehicle body 500 and the in-wheel motor 100. The upper arm 210 may have a through-hole 211 allowing the shock absorber module 300 to extend therethrough, such that the shock absorber module 300 may be connected to a bottom portion of the in-wheel motor 100 while extending through the through-hole 211.

The support arm 200 and the upper arm 210 according to the first embodiment of the present invention may be provided in the shape of a double wishbone comprised of the upper arm 210 and the lower arm 220.

Accordingly, it is possible to set a negative camber, and low floor setting with a lowered vehicle height may be realized.

When the negative camber is set, the cornering performance of the vehicle may be improved.

In addition, the upper arm 210 may have the through-hole 211 allowing the shock absorber module 300 to extend therethrough, and the shock absorber may be connected to the bottom portion of the in-wheel motor 100 by extending through the upper arm 210.

Accordingly, the shock absorber module 300 may be tilted about the top-bottom diameter of the in-wheel motor 100 to be connected to the in-wheel motor 100.

Accordingly, the performance of the shock absorber module 300 to absorb shock and vibrations occurring from the road and transmitted to the wheel and the in-wheel motor 100 may be improved.

The shock absorber module 300 may have a second connecting portion 350 extending through the upper arm 210 and connected and coupled to the in-wheel motor 100 to be rotatable in a direction intersecting the longitudinal direction.

The second connecting portion 350 may be provided to be rotatable in the direction intersecting the longitudinal direction to couple the second end of the shock absorber module 300 to the in-wheel motor 100 by preventing interference with the upper arm 210.

Accordingly, the shock absorber module 300 may rotate along with the rotation of the steering motor 400 and swivel the in-wheel motor 100 in the front-back direction of the vehicle by preventing interference with the upper arm 210.

The shock absorber module 300 may be connected to the in-wheel motor 100, with the central shaft thereof being inclined with respect to the top-bottom radial axis of the in-wheel motor 100.

The shock absorber module 300 may be connected to the in-wheel motor 100 while being tilted with respect to the top-bottom radial axis of the in-wheel motor 100. Accordingly, the shock absorber module 300 may absorb shock and vibrations occurring through the wheel in a variety of directions.

The first end of the support arm 200 may be coupled to the vehicle body 500 to be rotatable in the top-bottom direction, and the second end of the support arm 200 may be coupled to the in-wheel motor 100 to be rotatable in any direction.

As illustrated in FIGS. 1 to 3, the support arm 200 may be coupled to the vehicle body 500 to be rotatable in the top-bottom direction of the vehicle.

Accordingly, when the vehicle is traveling on a bumpy road, the wheel may be moved in the top-bottom direction, thereby improving the quietness of the vehicle.

According to the second embodiment of the present invention, as illustrated in FIG. 5, the shock absorber module 300 may include a third connecting portion 360, a second end of which is connected to the in-wheel motor 100 through a rigid joint.

In the second embodiment of the present invention, the support arm 200 may be provided as a single support arm, and the shock absorber module 300 may be connected to the in-wheel motor 100 in a position above the support arm 200 to swivel the in-wheel motor 100.

Here, the shock absorber module 300 is not required to prevent interference with the upper arm 210 unlike in the first embodiment. Thus, the third connecting portion 360 may be coupled to the in-wheel motor 100 through a component, such as a rigid joint.

Accordingly, the structure of the vehicle may be more simplified, the weight of the vehicle may be further reduced, and the range of use of the cabin may be further increased.

In addition, the in-wheel motor 100 may be swiveled and steered about a virtual steering axis Sa extending through the second end of the support arm 200 coupled to the in-wheel motor 100 and the first connecting portion 340 connecting the shock absorber module 300 and the steering motor 400.

That is, since the in-wheel motor 100 and the support arm 200 are connected through a ball joint and the top end of the shock absorber module 300 is connected to the steering motor 400 through a universal joint, the virtual steering axis Sa is drawn between the center of rotation of the ball joint and the universal joint. Accordingly, the steering motor 400 is swiveled about the virtual steering axis Sa.

The shock absorber module 300 includes an elastic member 370 surrounding the outer portions of the shock absorber module 300. The elastic member 370 may be compressed or stretched as the length of the shock absorber module 300 is changed, thereby absorbing shock applied to the vehicle body 500.

The shock absorber module 300 may absorb shock and vibrations using the fluid contained within the cylinder 310. In addition, the shock absorber module 300 includes the elastic member 370 having the shape of a spring surrounding the cylinder 310 and the rod 320, and on the basis of compressing and stretching of the spring, may absorb shock and vibrations occurring from the road surface and transmitted to the vehicle body 500 through the wheel and the in-wheel motor 100.

Accordingly, it is possible to double-absorb shock and vibrations occurring from the road surface and transmitted to the vehicle body 500 through the wheel and the in-wheel motor 100.

The shock absorber module 300 may be allowed to be displaced in the longitudinal direction, whereas rotation thereof about the longitudinal direction may be prevented.

In addition to the configuration comprised of the protrusions 321 and the first slots 311 or the configuration comprised of the fixing portions 330 and the second slots 312, the shock absorber module 300 may have any other configuration movable in the longitudinal direction, in which the shock absorber module 300 is prevented from rotating about the longitudinal direction. In addition, according to any other configurations, the shock absorber module 300 may move in the longitudinal direction while being prevented from rotating about the longitudinal direction.

Although the specific embodiments of the present invention have been described for illustrative purposes, those skilled in the art will appreciate that various modifications, additions, and substitutions are possible, without departing from the scope and spirit of the present invention as disclosed in the accompanying claims.

What is claimed is:

1. An independent drive module, comprising:
   an in-wheel motor configured to provide driving force to a wheel of a vehicle;
   a support arm including a first end connected to a vehicle body and a second end connected to the in-wheel motor, to support the in-wheel motor;
   a shock absorber module including a first end connected to the in-wheel motor and a second end connected to the vehicle body, the shock absorber being configured to absorb shock between the in-wheel motor and the vehicle body and swivel the in-wheel motor during turning of the vehicle so as to perform both shock absorption and steering; and
   a steering motor connected to the second end of the shock absorber module to transmit rotational force for the steering to the shock absorber module,
   wherein the shock absorber module comprises:
   a cylinder extending in a longitudinal direction and containing fluid; and a rod inserted into the cylinder and configured to slide in the longitudinal direction, and wherein the rod includes a protrusion protruding outward from an outer surface, and the cylinder includes a slot indented in a position corresponding to the protrusion.

2. The independent drive module according to claim 1, wherein the shock absorber module further comprises a fixing portion disposed on an outer portion of the cylinder and extending in the longitudinal direction, and wherein the cylinder includes a slot indented in a position corresponding to the fixing portion such that the fixing portion is inserted into the slot.

3. The independent drive module according to claim 1, wherein the shock absorber module comprises a connecting portion connected and coupled to the steering motor to be rotatable in a direction intersecting a longitudinal direction of the shock absorber module, such that the connecting portion transmits rotary force of the steering motor to the in-wheel motor, thereby swiveling the in-wheel motor.

4. The independent drive module according to claim 1, wherein the support arm comprises an upper arm and a lower arm spaced apart from each other in a top-bottom direction and connecting the vehicle body and the in-wheel motor to each other, wherein the upper arm includes a through-hole, and wherein the shock absorber module is connected to a bottom portion of the in-wheel motor while extending through the through-hole.

5. The independent drive module according to claim 4, wherein the shock absorber module comprises a connecting portion extending through the upper arm and coupled to the in-wheel motor to be rotatable in a direction intersecting a longitudinal direction of the shock absorber module.

6. The independent drive module according to claim 4, wherein the shock absorber module is connected to the in-wheel motor such that a central shaft of the shock absorber module is inclined with respect to a top-bottom radial axis of the in-wheel motor.

7. The independent drive module according to claim 1, wherein the first end of the support arm is coupled to the vehicle body to be rotatable in a top-bottom direction, and the second end of the support arm is coupled to the in-wheel motor to be rotatable in any direction.

8. The independent drive module according to claim 7, wherein the in-wheel motor is configured to be swiveled and steered about a virtual steering axis extending through the second end of the support arm and a connecting portion connecting the shock absorber module and the steering motor.

9. The independent drive module according to claim 1, wherein the shock absorber module comprises a connecting portion including an end connected to the in-wheel motor through a rigid joint.

10. The independent drive module according to claim 1, wherein the shock absorber module comprises an elastic member surrounding outer portions of the shock absorber module, and wherein the elastic member is compressed or stretched as a length of the shock absorber module is changed, thereby absorbing shock applied to the vehicle body.

11. The independent drive module according to claim 1, wherein the shock absorber module is configured to be displaced in a longitudinal direction of the shock absorber module, while rotation of the shock absorber module about the longitudinal direction is prevented.

12. An independent drive module, comprising:

an in-wheel motor configured to provide driving force to a wheel of a vehicle;

a support arm including a first end connected to a vehicle body and a second end connected to the in-wheel motor, to support the in-wheel motor;

a shock absorber module including a first end connected to the in-wheel motor and a second end connected to the vehicle body, the shock absorber being configured to absorb shock between the in-wheel motor and the vehicle body and swivel the in-wheel motor during turning of the vehicle so as to perform both shock absorption and steering; and a steering motor connected to the second end of the shock absorber module to transmit rotational force for the steering to the shock absorber module, wherein the shock absorber module comprises:

a cylinder extending in a longitudinal direction and containing fluid;

a rod inserted into the cylinder and configured to slide in the longitudinal direction;

a fixing portion disposed on an outer portion of the cylinder and extending in the longitudinal direction, and wherein the cylinder includes a slot indented in a position corresponding to the fixing portion such that the fixing portion is inserted into the slot.

\* \* \* \* \*